Nov. 17, 1936.  V. E. ROYLE  2,061,407

EXTRUDING MACHINE

Filed June 26, 1935  2 Sheets-Sheet 1

INVENTOR
Vernon E. Royle
BY
ATTORNEYS

Nov. 17, 1936.   V. E. ROYLE   2,061,407
EXTRUDING MACHINE
Filed June 26, 1935   2 Sheets-Sheet 2

INVENTOR
Vernon E. Royle
BY
ATTORNEYS

Patented Nov. 17, 1936

2,061,407

UNITED STATES PATENT OFFICE 2,061,407

EXTRUDING MACHINE

Vernon E. Royle, Paterson, N. J.

Application June 26, 1935, Serial No. 28,422

4 Claims. (Cl. 18—12)

This invention relates to an extruding machine and more particularly to that class of such machines which are designed for the production of the so-called treads of pneumatic vehicle tires. These treads, as well understood, are composed of rubber compound and vary in thickness when viewed in cross section. The product of these machines is also delivered in a continuous flat strip to be cut into predetermined lengths, as desired.

One object of the invention is to provide a structure that minimizes the distance of travel of the material passing from the stock screw or plodder to the point of extrusion.

Another object is to provide a structure having means for quickly and easily moving the tread die head into and out of operative position, for cleaning, repair or replacement.

A further object is to provide a means for locking and unlocking the tread die head to and from the cylinder with a minimum of movement and without disassembling the parts as a unit.

A still further object consists in providing certain improvements in the form, construction and arrangement of the several parts whereby the above named and other objects may effectively be attained.

A practical embodiment of my invention is represented in the accompanying drawings, in which Fig. 1 represents a front elevation of a tire tread extruding machine which includes my invention;

Figure 1:
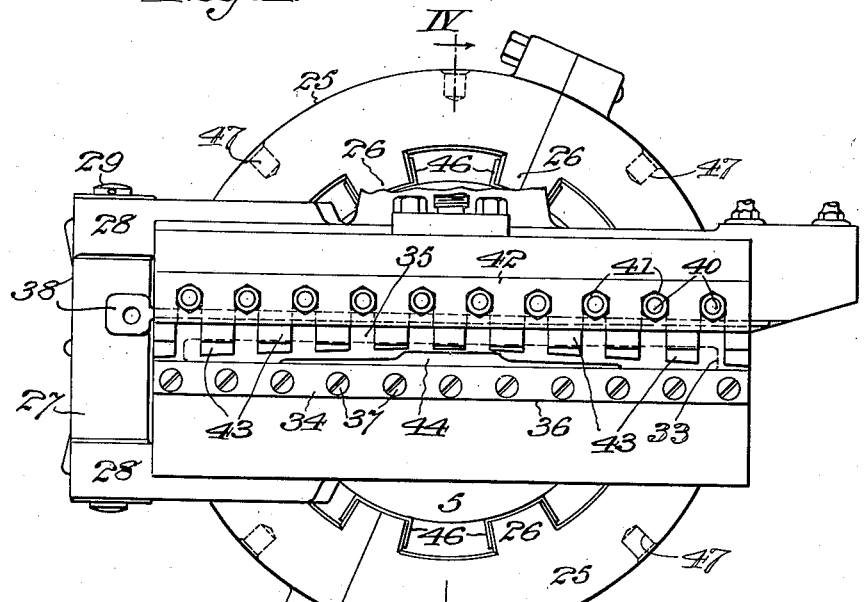
Figure 2:
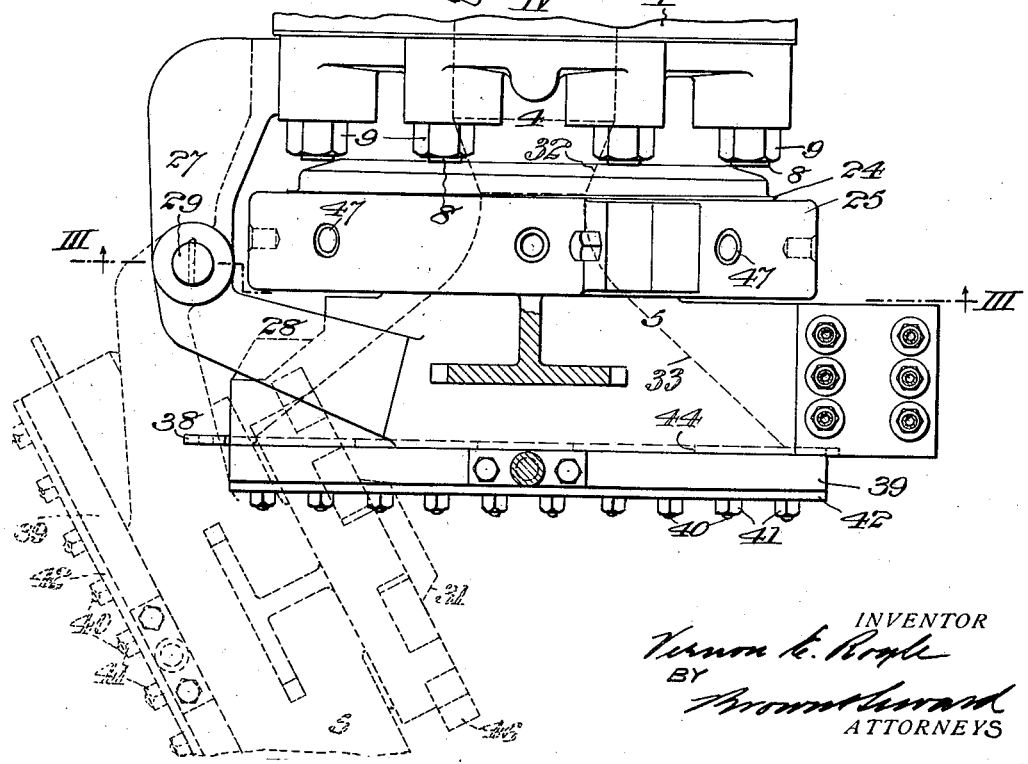
Fig. 2 represents a detail plan view of the same, with certain parts broken away.

Machines of this character are so designed to operate on rubber compounds which may vary in character and consistency. Consequently, it has been found that the heads heretofore in use have to be repeatedly taken apart and cleaned and assembled before the machine can be again set in operation, which dismantling and assemblage consumes a considerable amount of time and labor in handling the parts. My invention is designed to overcome these disadvantages and thereby enhance the capacity of the output of the machine, as well as embody advantages inherent in the construction.

The cylinder of the extruding machine may be of any well known or approved form, of which only the front portion is shown and denoted by 1.

The usual stock screw or plodder 2 is housed in the liner 3 of the cylinder and projects therefrom for co-operation with the head.

The head comprises a fixed member 4 and a movable member 5. The fixed member 4 may be provided with suitable passages 6 which register with similar passage 7 in the cylinder 1 for the circulation of a temperature controlling medium in a manner well understood in the art. The member 4 is secured to the cylinder 1 by stud bolts 8 and nuts 9 threaded thereon. The member 4 is also recessed at 10 to receive a reduced portion 11 that projects forwardly from the liner 3. A bushing 12 is fitted in a bore 13 in the member 4 and has an annular flange 14 arranged to seat in a recess 15 in the member. The bushing 12 is secured to the member by cap screws 16, while the bushing is prevented from turning in the bore 13 by a key or spline 17. The bushing 12 also has a cylindrical bore 18 terminating in a tapered bore 19, which cylindrical bore 18 is disposed in precise alinement with the bore of the liner 3. The transverse face 20 of the bushing 12 is provided with an annular seat 21 which is flared outwardly from the restricted end of the tapered bore 19 to the transverse face 20. The fixed member 4 is also recessed at 22, the transverse bottom 23 of which coincides with the transverse face 20 of the bushing 12. The exterior of the wall surrounding the recess 22 is provided with a screw thread 24 arranged to receive a sectional ring nut 25, the inner periphery of which has a series of segmental lugs 26 projecting inwardly therefrom in position to overhang the recess 22 in the member 4.

The movable member 5 is hinged to the fixed member 4 by means of an arm 27 projecting laterally and forwardly from the fixed member in position to coact with a pair of arms 28 projecting laterally and rearwardly from the movable member 5. The arms 27, 28 are hingedly connected by a pin 29 disposed in the ends of the arms.

The inner transverse face 30 of the movable member 5 is provided with a tapered or conical portion 31 developed outwardly therefrom and arranged to coact with the flared seat 21 of the fixed member 4. The movable member 5 is provided with a tapered bore 32 arranged to register with the bore 19 in the bushing 12. This tapered bore 32 is developed into a bore 33 which is restricted in one direction and elongated in another direction, so as to cause the material passing therethrough to be formed into a flat strip.

In order that the machine may extrude the material in a flat strip having different widths and configurations in cross section, I provide the front of the member 5 surrounding the outlet of the bore 33 with a die which comprises flat plates 34, 35 disposed in a recess 36 in the member 5. The plate 34 is fixed in the bottom of the recess 36 by screws 37, while the plate 35 is held in the recess 36 and in contact with the top edge of the plate 34 by a wedge 38 interposed between the upper wall of the recess 36 and the top of the plate 35. This plate 35 is prevented from moving outwardly of the recess 36 by means of a retainer 39 secured to the member 5 by a series of studs 40, nuts 41 threaded thereon and a clamping bar 42 which is perforated for the passage of the studs 40 therethrough and engaged by the nuts 41. The retainer 39 is further provided with depending fingers 43 which straddle the studs 40 and extend downwardly into close proximity to the lower edge of the plate 35 so as to reinforce the plate. The central portion of the adjacent edges of the plates 34, 35 are constructed to provide an outlet 44 therethrough for the material, which outlet is designed to mold the material as it is discharged therefrom.

The movable member 5 is provided with passages 45 for the circulation of a temperature controlling medium in a manner well known in the art.

The member 5 is maintained in operative position on the fixed member 4 by means of a series of segmental lugs 46 formed on the outer periphery of the member 5 adjacent the transverse face 38, which lugs 46 are housed in the recess 22 in the fixed member so as to be overlapped by the segmental lugs 26 on the ring nut 25. These lugs 26 and 46 have their sides cut on radial lines, and the lugs 46 are of such a size and form that they can pass through the spaces between the lugs 26 on the ring nut 25.

This construction enables the member 5 to be swung toward and away from the fixed member 4, during which movement the lugs 46 pass between the lugs 26 on the ring nut 25.

In order to conveniently actuate the ring nut 25 on the thread 24 of the fixed member 4 so that the lugs 26 may be brought into and out of overlapped relation with the lugs 46 on the member 5, I provide the periphery of the ring nut 25 with a series of sockets 47 into which a bar (not shown) may be inserted to afford a convenient leverage for rotating the ring nut.

Figure 3:
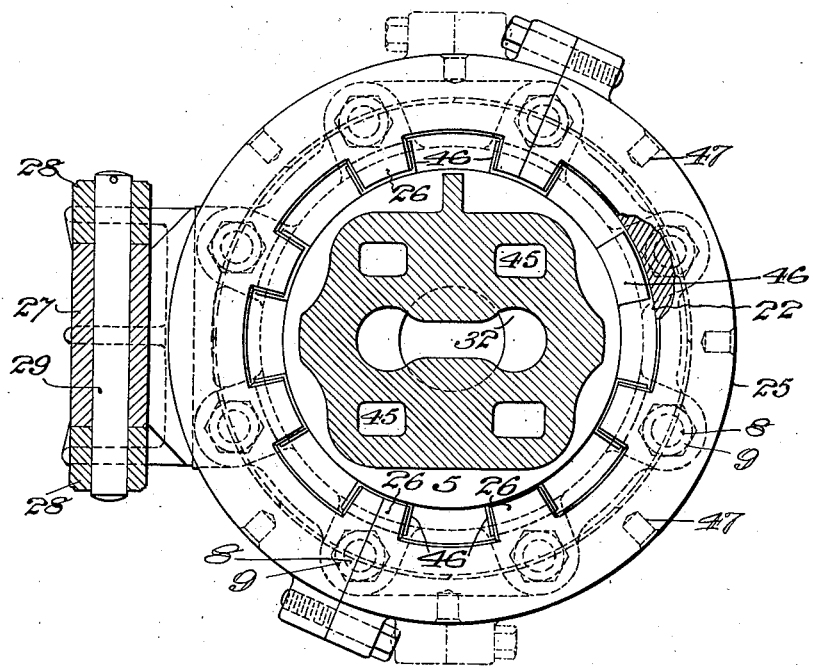
Fig. 3 represents a vertical section taken in the plane of the line III—III of Fig. 2, looking in the direction of the arrows.
Figure 4:
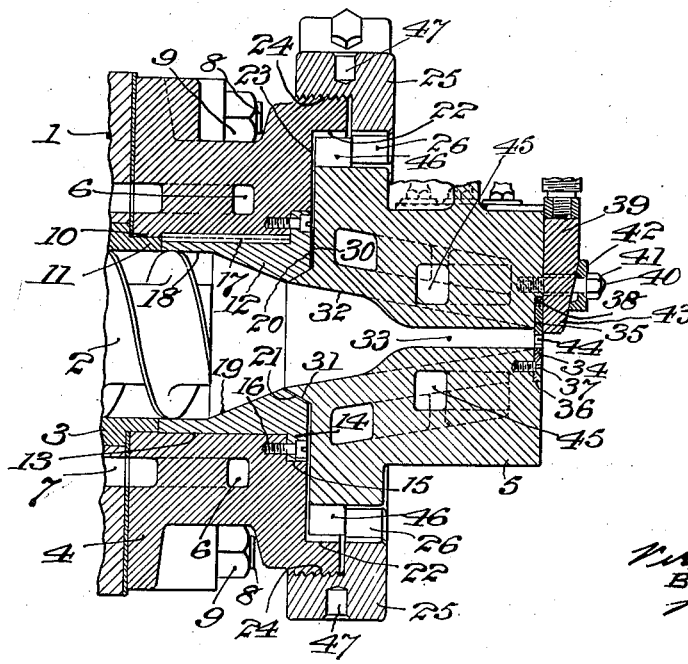
Fig. 4 represents a detail vertical longitudinal section taken in the plane of the line IV—IV of Fig. 1, looking in the direction of the arrows.

It will be observed that in rotating the ring nut 25 in the direction of the arrow marked A to the position shown in dotted outline in Fig. 3, the ring nut will be unscrewed on the thread 24 of the fixed member 4, which rotation moves the lugs 26 to the left as well as outwardly away from the contact surface of the lugs 46. This outward movement is compensated for by the coaction of the run of the threads on the member 4 and ring nut 25. The distance traveled in rotation by the ring nut, in the present instance, is about 22½°, or only sufficient to move the lugs 26 so that the spaces between the lugs will register with the lugs 46 on the movable member. When the ring nut is rotated in the reverse direction, it will be screwed onto the thread of the fixed member 4, thereby causing the lugs 26 to engage the lugs 46 and the tapered or conical portion 31 will be forced into coaction with the flared seat 21 of the bushing 12, which coaction alines the bores 19 and 32 of the fixed and movable members respectively.

From the foregoing it will be seen that the members may be quickly and easily locked and unlocked with a minimum movement of the parts, and the movable member may be swung away from the fixed member so that the bores 19 and 32 will be wholly exposed for cleaning, repair or replacement without disassembling the head.

As the operation of the machine has been set forth in connection with the description of the form and arrangement of the several parts, there is no necessity of restating it at this juncture.

As a result of the construction hereinabove described, there is obtained a machine of this character which may be manufactured and assembled with accuracy and expedition, which is very positive and effective in operation.

The parts constituting my invention are readily adaptable to any well known or approved form of tubing or extruding machine and will thus provide a machine which rapidly and efficiently performs the intended function and supplies the product in a condition which is suitable and convenient for transportation and use.

It will be understood that various changes may be resorted to in the form, construction and arrangement of the several parts without departing from the spirit and scope of my invention; and hence, I do not intend to be limited to the details herein shown and described except as they may be included in the claims.

What I claim is:

1. In a machine for extruding plastic material, the combination with a cylinder housing a stock screw, of a head comprising a member fixed to the cylinder and having a longitudinal bore for receiving the end of the screw and a movable member hinged to said fixed member and arranged to swing into and out of engagement with the fixed member, said fixed member having an exterior screw threaded surface and an annular recess in its outer face, said movable member being provided with exterior radial projections adapted to be moved into and out of said annular recess in the fixed member, and an axially rotatable means having a screw threaded engagement with the screw threaded surface of the fixed member, said means being provided with interior radial projections arranged to overhang the recess and designed to be brought into and out of engagement with the exterior projections on the movable member for locking and releasing it from the fixed member.

2. In a machine for extruding plastic material, the combination with a cylinder housing a stock screw, of a head comprising a member fixed to the cylinder and having a longitudinal bore for receiving the end of the screw and a movable member hinged to said fixed member and arranged to swing into and out of engagement with the fixed member, said fixed member having an exterior screw threaded surface and an annular recess in its outer face, said movable member being provided with exterior radial projections adapted to be moved into and out of said annular recess in the fixed member, the outer vertical face of each of said exterior projections being disposed to extend beyond said recess, and an axially rotatable means having a screw threaded engagement with the screw threaded surface of the fixed member, said means being provided with interior radial projections arranged to overhang the recess and designed to be brought into and out of engagement with the extended portions of the exterior projections on the movable member for locking and releasing it from the fixed member.

3. In a machine for extruding plastic material, the combination with a cylinder housing a stock screw, of a head comprising a member fixed to the cylinder and having a longitudinal bore for receiving the end of the screw and a movable member hinged to said fixed member and arranged to swing into and out of engagement with the fixed member, said fixed member having an exterior screw threaded surface and an annular recess in its outer face, said movable member being provided with exterior radial projections adapted to be moved into and out of said annular recess in the fixed member, and an axially rotatable means having a screw threaded engagement with the screw threaded surface of the fixed member, said means comprising a ring nut divided into sections secured together and having an interior screw threaded portion arranged to engage the exterior screw threaded surface of the fixed member, said sections being provided with interior radial projections overhanging the recess and designed to be brought into and out of engagement with the exterior projections on the movable member for locking and releasing it from the fixed member.

4. In a machine for extruding plastic material, the combination with a cylinder housing a stock screw, of a head comprising a member fixed to the cylinder and having a longitudinal bore for receiving the end of the screw and a movable member hinged to said fixed member and arranged to swing into and out of engagement with the fixed member, said fixed member having an exterior screw threaded surface and an annular recess in its outer face, said movable member being provided with exterior radial projections adapted to be moved into and out of said annular recess in the fixed member, the outer vertical face of each of said exterior projections being disposed to extend beyond said recess, and an axially rotatable means having a screw threaded engagement with the screw threaded surface of the fixed member, said means comprising a ring nut divided into sections secured together and having an interior screw threaded portion arranged to engage the exterior screw threaded surface of the fixed member, said sections being provided with interior radial projections overhanging the recess and designed to be brought into and out of engagement with the exterior projections on the movable member for locking and releasing it from the fixed member.

VERNON E. ROYLE.